US006886682B2

(12) United States Patent
Bowlin et al.

(10) Patent No.: US 6,886,682 B2
(45) Date of Patent: May 3, 2005

(54) LINK SYSTEM

(75) Inventors: Geoffrey R. Bowlin, Oak Ridge, NC (US); Joseph G. Schill, Lynchburg, VA (US); Jeffrey Lee Shortridge, Lynchburg, VA (US)

(73) Assignee: Delaware Capital Formation Inc., Wilmington, DE (US)

( * ) Notice: Subject to any disclaimer, the term of this patent is extended or adjusted under 35 U.S.C. 154(b) by 118 days.

(21) Appl. No.: 10/243,845

(22) Filed: Sep. 16, 2002

(65) Prior Publication Data

US 2004/0050668 A1 Mar. 18, 2004

(51) Int. Cl.$^7$ .......................... B65G 37/00; B21D 51/00
(52) U.S. Cl. ........................................ 198/583; 158/576
(58) Field of Search ................................. 198/583, 576; 72/95; 413/69

(56) References Cited

U.S. PATENT DOCUMENTS

| | | | |
|---|---|---|---|
| 4,446,714 A | 5/1984 | Cvacho | |
| 4,519,232 A | 5/1985 | Traczyk et al. | |
| 4,732,027 A | * | 3/1988 | Traczyk et al. ............... 72/133 |
| 5,553,826 A | 9/1996 | Schultz | |
| 5,611,231 A | 3/1997 | Marritt et al. | |
| 5,785,294 A | 7/1998 | Schultz | |
| 6,085,563 A | 7/2000 | Heiberger et al. | |
| 6,178,797 B1 | 1/2001 | Marshall et al. | |
| 6,240,760 B1 | 6/2001 | Heiberger et al. | |
| 6,257,544 B1 | 7/2001 | Schultz | |
| 2002/0029599 A1 | 3/2002 | Heiberger et al. | |

FOREIGN PATENT DOCUMENTS

| | | |
|---|---|---|
| EP | 0 570 005 A2 | 11/1993 |
| WO | WO 97/37786 | 10/1997 |

* cited by examiner

Primary Examiner—Douglas Hess
(74) Attorney, Agent, or Firm—Foley & Lardner LLP (57) ABSTRACT

A link for connecting an upstream and a downstream multi-turret processing machines, a method for linking an upstream and a downstream multi-processing machines, and a multi-turret processing, the link comprising: a base; a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel; a link processing turret disposed in said center aperture; and one or more gears for meshing indirectly with gears in the upstream and downstream multi-turret processing machines.

21 Claims, 10 Drawing Sheets

LINK SYSTEM

FIELD OF THE INVENTION

The present invention relates generally to multi-turret processing machines for performing various processing functions on work objects such as cans or bottles, and more particularly, to a link system and method for connecting two fixed base machines or a fixed base and a modular machine.

BACKGROUND OF THE INVENTION

There is a continuing need for systems and methods for efficiently and cost-effectively linking a fixed base multi-turret processing machine with either another fixed base multi-turret processing machine or with a modular multi-turret processing machine. Methods for properly aligning and linking such existing multi-turret processing machines effectively and in a cost-effective manner and without utilizing an undue amount of real estate are lacking in the art.

SUMMARY OF THE INVENTION

The present invention comprises in one embodiment, a link for connecting an upstream and a downstream multi-turret processing machines, comprising: a base; a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel; a link processing turret disposed in said center aperture; and one or more gears for meshing indirectly with gears in the upstream and downstream multi-turret processing machines.

In another embodiment of the present invention, the link further comprises a gearcase near to the bridge for encasing the one or more gears for the link processing turret, the gearcase having separate mating surfaces for mating with respective gearcases for the multi-turret processing machines, with at least one of these matting surfaces being adjustable.

In another embodiment of the present invention, the mating surface for mating with the gearcase of the upstream multi-turret processing machine is at an angle with the mating surface for the mating with the gearcase of the downstream multi-turret processing machine so that planes of the mating surfaces converge in the direction of the bridge.

In another embodiment of the present invention, the link further comprises a temporary alignment beam disposed on the base on an opposite side from but in parallel to the bridge for connecting at one portion thereof to the upstream multi-turret processing machine, at a second portion thereof to the link base, and at a third portion thereof to the downstream multi-turret processing machine.

In another embodiment of the present invention, the bridge connects to and supports a tooling cam for each of the upstream, link and downstream turrets.

In another embodiment of the present invention, an upstream bearing plate bears a substantial portion of weight of the last turret and a downstream bearing plate bears a substantial portion of weight of the first turret, and further comprising at least one shim between one of the bearing plates and the bridge in order to align one of the last turret or the first turret in an axial direction with respect to the link turret.

In another embodiment of the present invention, the link further comprises an upstream or a downstream grouting footings disposed on at least one side of the base parallel to a centerline for the base.

In another embodiment of the present invention, a multi-turret processing machine is provided comprising: an upstream multi-turret processing machine with a base and with a plurality of in-line parallel turrets including a last upstream turret and an upstream gear train; a downstream multi-turret processing machine with a base and with a plurality of in-line parallel turrets including a first downstream turret and a downstream gear train; a separable link connecting the upstream and the downstream multi-turret processing machines, the link including a base, a bridge disposed on the base and forming a cross-piece for a T to the base, one end of the cross-piece being connected to the base of the upstream multi-turret processing machine and the opposite end of the cross-piece being connected to the base of the downstream multi-turret processing machine, the bridge including a center aperture, an upstream aperture on an upstream side of the center aperture holding the last upstream turret therein, a downstream aperture on a downstream side of the center aperture opposite to the upstream side holding the first existing downstream turret therein, and a link processing turret held in the center aperture, all three turrets being in-line and in parallel, the link further including one or more gears for meshing indirectly with gears in the upstream and downstream gear trains.

In another embodiment of the present invention, a method is provided for linking an upstream and a downstream multi-turret processing machines, comprising the steps of: removing a last turret and any discharge transfer assembly therefor from the upstream multi-turret processing machine; removing the first turret and any infeed therefor from the downstream multi-turret processing machine; aligning the upstream and downstream multi-turret processing machines with a link so that turrets in the upstream and downstream multi-turret processing machines and a link turret will be substantially in parallel, wherein the link comprises a base and a bridge, with the bridge forming a cross-piece for a T to the base to allow connection on one end of the cross-piece to a base of the upstream multi-turret processing machine and to allow connection at the opposite end of the cross-piece to a base of the downstream multi-turret processing machine, the bridge including a center aperture, an upstream aperture on an upstream side of the center aperture, and a downstream aperture on a downstream side of the center aperture, the center aperture for holding link turret for processing, the upstream aperture for holding the last turret from the upstream multi-turret processing machine and the downstream aperture for holding the first turret of the downstream multi-turret processing machine; connecting the one end of the cross-piece to the base of the upstream multi-turret processing machine and connecting the opposite end of the cross-piece to the base of the downstream multi-turret processing machine; inserting the link turret for processing in the center aperture of the bridge; disposing the removed last turret from the upstream multi-turret processing machine into the upstream aperture of the bridge and disposing the removed first turret from the downstream multi-turret processing machine into the downstream aperture of the bridge so that a work object may be passed from the last turret to the link turret to the first turret; and inserting one or more link gears to mate with a last gear of the upstream multi-turret processing machine and a first gear of the downstream multi-turret processing machine.

In another embodiment of the present invention, the method further comprises the step of inserting a link gearcase having an upstream mating surface and a downstream mating surface to encase the one or more link gears.

In another embodiment of the present invention, the method further comprises modifying the gearcase of at least one of the upstream gearcase or the downstream gearcase to have a mating surface at an angle which is not perpendicular to a gear train axis of gears therein in order to mate with one of the upstream or downstream mating surfaces of the link gearcase.

In another embodiment of the present invention, the method further comprises modifying an upstream gearcase for the upstream multi-turret processing machine and a downstream gearcase for the downstream multi-turret processing machine to have respective mating surfaces that converge in a direction of the bridge.

In another embodiment of the present invention, an upstream bearing plate bears a substantial portion of weight of the removed last turret and a downstream bearing plate bears a substantial portion of weight of the removed first turret, and the method further comprises the step of inserting at least one shim between one of the bearing plates and the bridge in order to align one of the last turret or the first turret in an axial direction with respect to the link turret.

In another embodiment of the present invention, the method further comprises connecting a temporary alignment beam on the link on an opposite side from but in parallel to the bridge and connecting one portion of the temporary alignment beam to the upstream multi-turret processing machine, and connecting a second portion of the temporary alignment beam the downstream multi-turret processing machine.

In another embodiment of the present invention, the method further comprises the steps of disposing at least one footing to support the base; and removing the temporary alignment beam that aligns the upstream, downstream and link turrets.

In another embodiment of the present invention, the method further comprises the step of forming grouting footings on at least one of an upstream or a downstream side of the base parallel to a centerline for the base to create a bedding plane between the base and the one of the upstream or downstream multi-turret processing machines, wherein the grouting footing forming step comprises pouring liquid grouting into a dammed area to form a footing.

DETAILED DESCRIPTION OF THE EMBODIMENTS OF THE INVENTION

Figure 1:
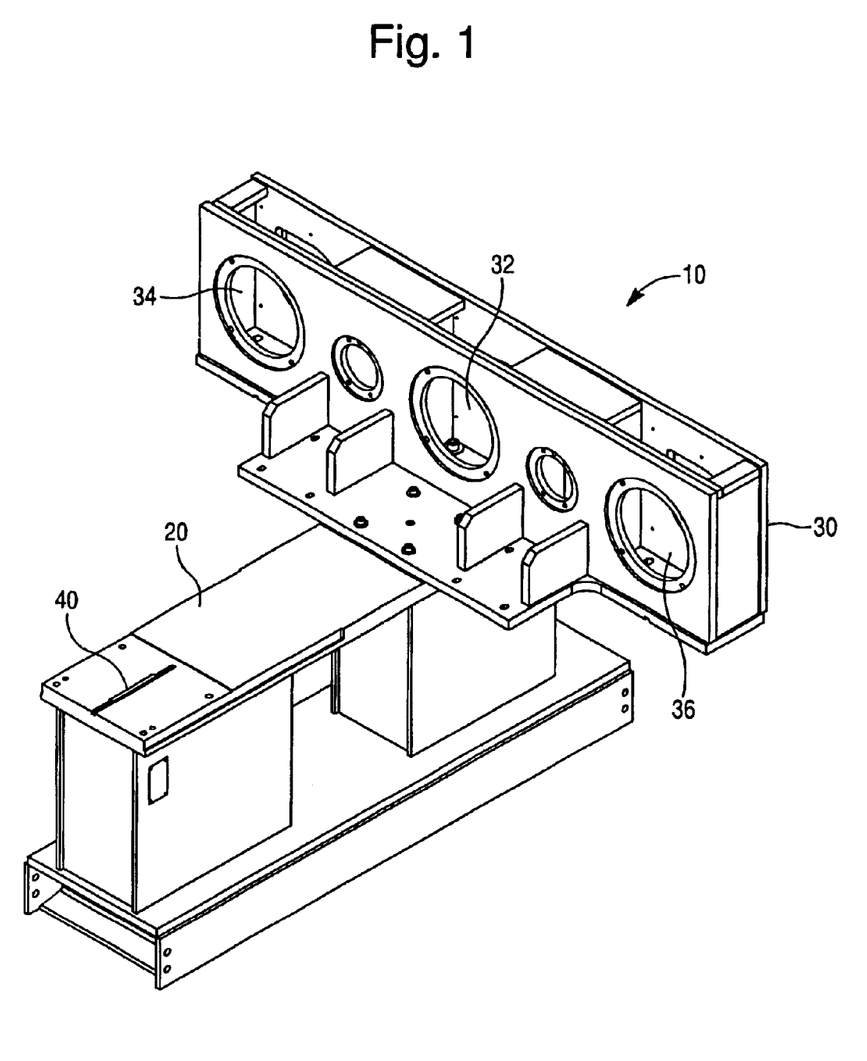
FIG. 1 is a schematic perspective drawing of a link in accordance with an embodiment of the present invention without a link turret.
Figure 2:
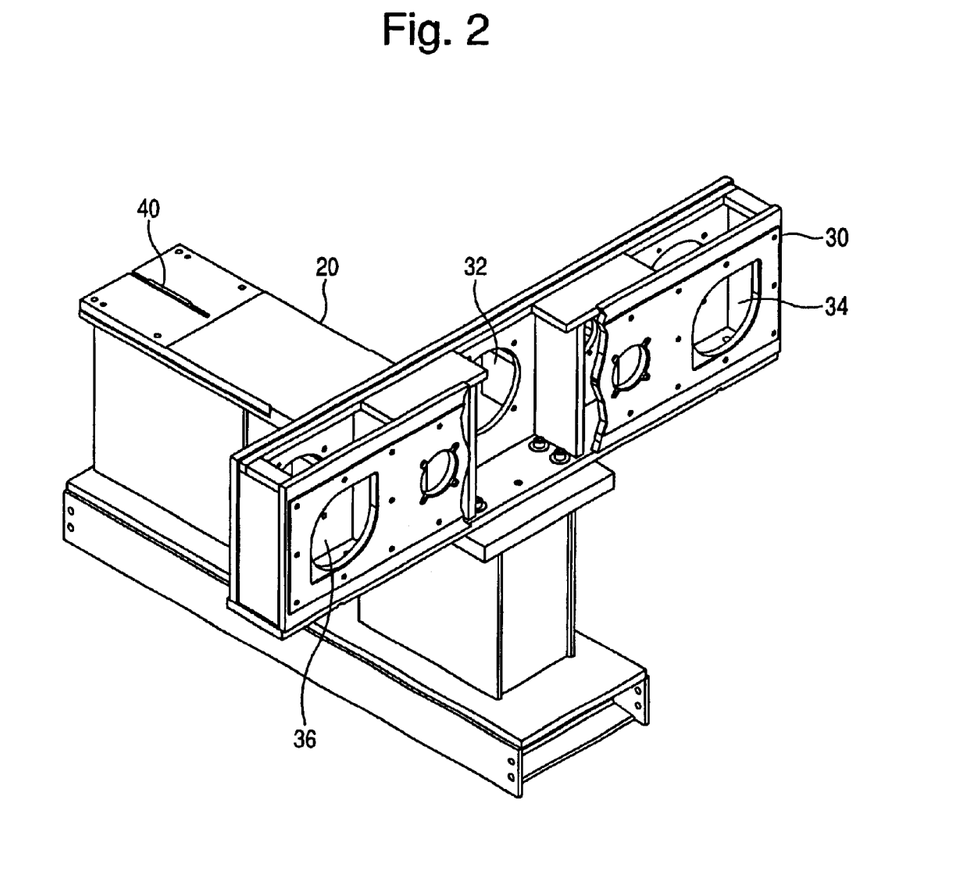
FIG. 2 is a different perspective view of the link of FIG. 1.

The terms "upstream" and "downstream" are used in the present application and are intended to be interpreted broadly as also applying to left-to-right and right-to-left operation, depending on the direction of flow of work items in the machines. Referring now to FIG. 1, a link 10 in accordance with an embodiment of the present invention is shown. The link 10 comprises a base 20 with a bridge 30 disposed on the base 20 in such a manner as to form a cross-piece of a T with the base. The bridge 30 is to connect on one end of the cross-piece to a base of an upstream multi-turret processing machine and to connect at the opposite end of the cross-piece to a base of a downstream multi-turret processing machine. The bridge 30 may be connected to the base to form the T using any convenient connection method. In FIG. 1 bolts are used for the connection. The bridge 30 includes a center aperture 32, an upstream aperture 34 on an upstream side of the center aperture 32 and a downstream aperture 36 on the downstream side of the center aperture 32 opposite to the upstream side. The upstream aperture 34 is designed to hold a last existing upstream turret on the upstream multi-turret processing machine, the center aperture 32 is designed to hold a link processing turret, and the downstream aperture 36 is designed to hold a first existing downstream turret in the downstream multi-turret processing machine. All three of the turrets are to be in parallel and in-line. In a preferred embodiment of the link 10, one or more keyways 40 that may be parallel to the link of the base 20 are shown and utilized for positioning the link turret. FIG. 2 illustrates the link base 20 and bridge 30 from a different perspective.

Figure 9A:
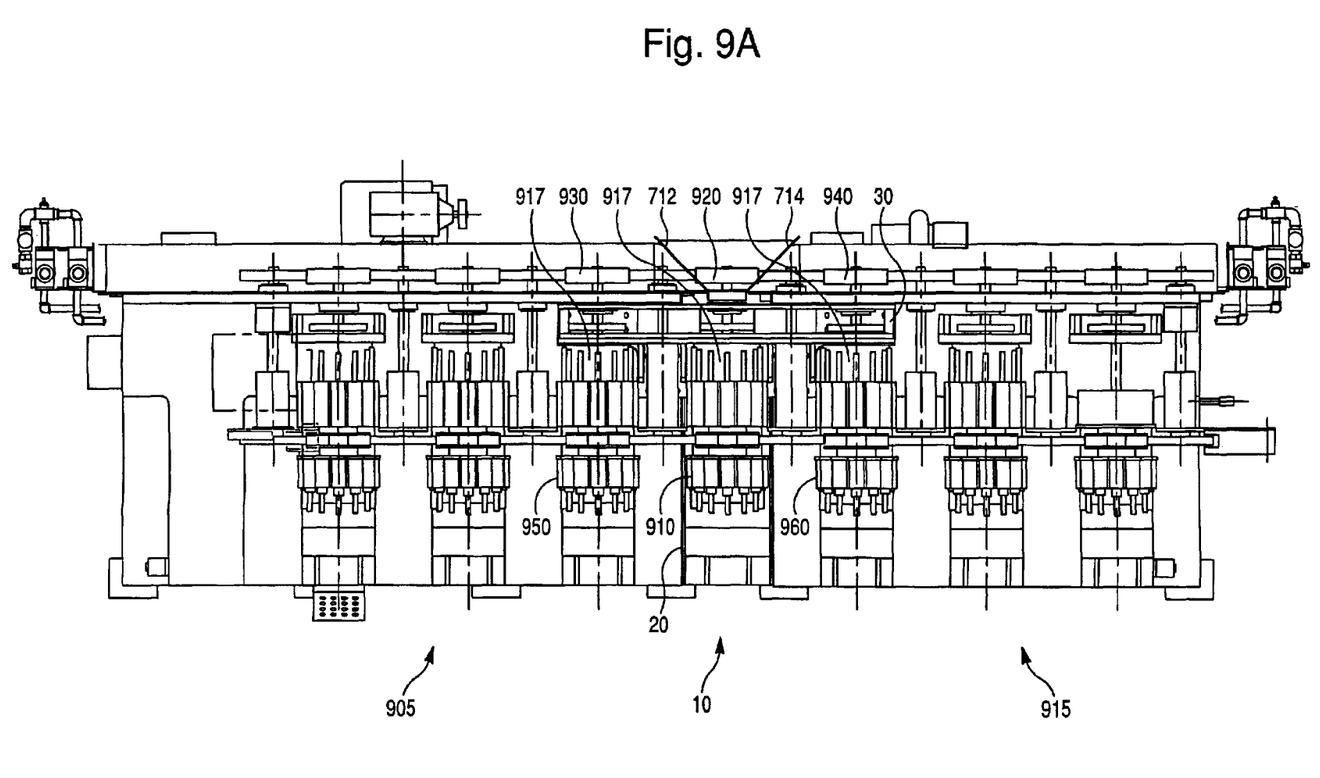
FIG. 9A is a top view of a multi-turret processing machine formed from an upstream multi-turret processing machine, a downstream multi-turret processing machine, and a link connecting the upstream and downstream multi-turret processing machines.

The link 10 further includes a link processing turret, shown in FIG. 9A as reference number 910. The link processing turret 910 includes one or more gears 920 for meshing indirectly by means of intermediate gears with gears 930 and 940 in the upstream and downstream multi-turret processing machines, respectively.

Figure 4:
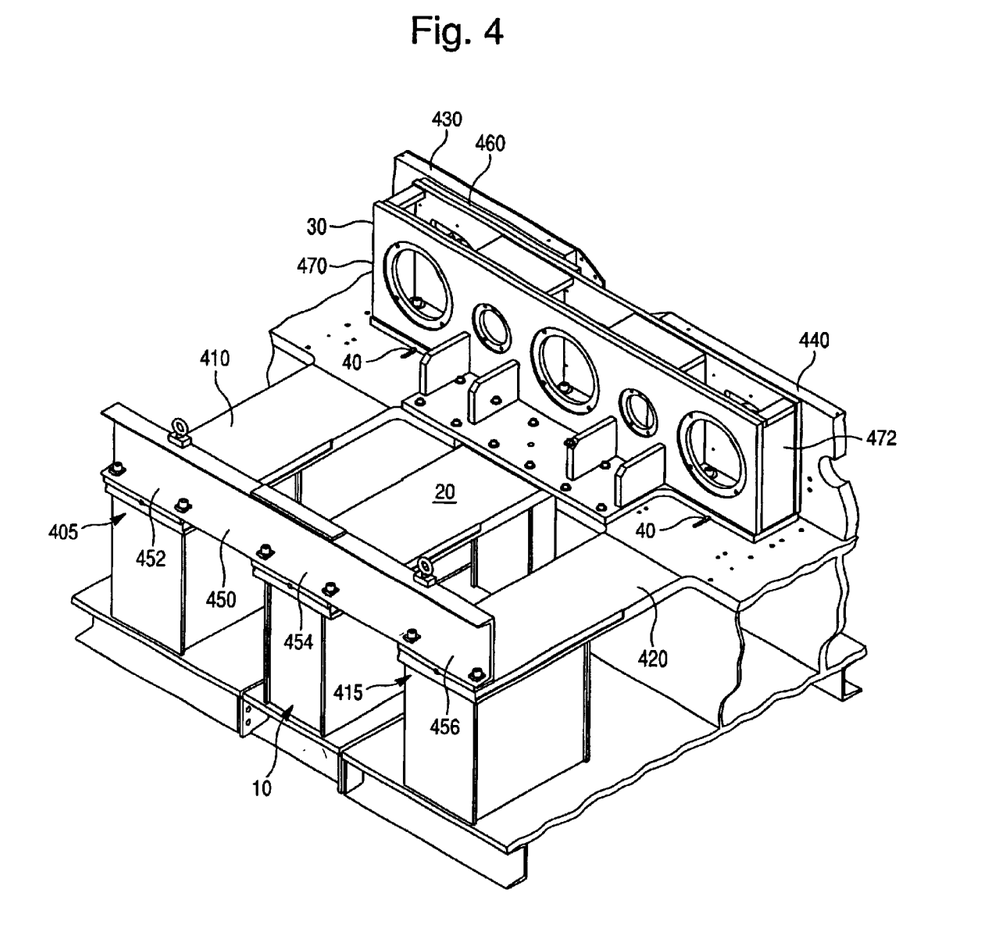
FIG. 4 is a schematic perspective diagram of a link in accordance with an embodiment of the present invention with a bridge fixed at either end to fixed based multi-turret processing machines but without turrets disposed therein.
Figure 5:
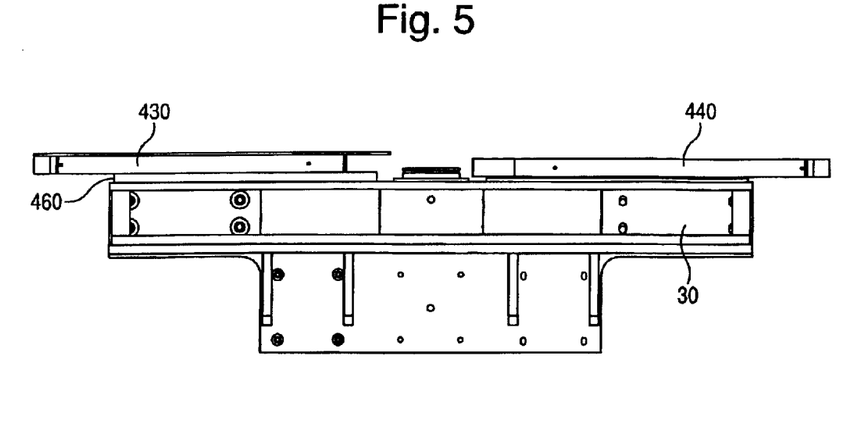
FIG. 5 is a top view of one embodiment of a bridge in accordance with the present invention with a shim disposed between the bridge and a bearing plate.

Referring to FIG. 4, the link 10 is shown attached via the bridge 30 to a base 410 of an upstream multi-processing machine 405 and a base 420 of a downstream multi-turret processing machine 415. A bearing plate 430 for the upstream multi-processing machine 405 is shown, as well as a bearing plate 440 for the downstream multi-turret processing machine 415. These bearing plates 430 and 440 may be utilized to bear a substantial portion of the weight of their respective turrets. Also shown in FIG. 4 is a temporary alignment beam 450 disposed on the base 20 of link 10 on an opposite side from but in parallel to the bridge 30 for connecting at one portion 452 thereof to the upstream multi-turret processing machine, and at a second portion 454 thereof to the base 20 of link 10, and at a third portion 456 there of to the downstream multi-turret processing machine 415. It should be noted that at least one shim 460 (FIG. 4) may be disposed between one of the bearing plates 430 and 440 and the bridge 30 in order to align one of the last turret (950 in FIG. 9B) of the upstream multi-turret processing machine 405 (905 in FIG. 9A) or the first turret (960 in FIG. 9B) in the downstream multi-processing machine 415 (915 in FIG. 9A) in an axial direction with respect to the link turret 10 (910 in FIG. 9A). A better view of the positioning of the shim 460 between at least one of the bearing plates 430 and the bridge 30 may be seen in FIG. 5.

Figure 7:
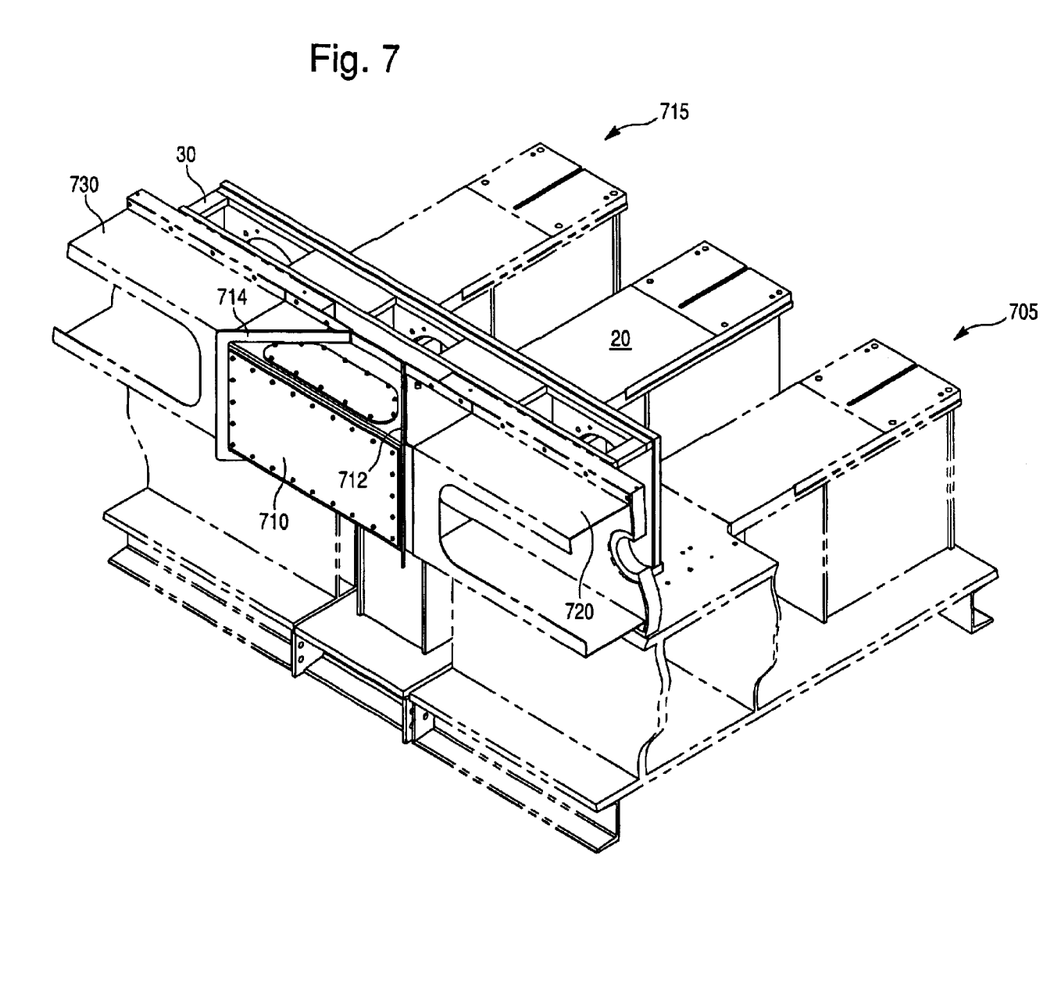
FIG. 7 is a perspective view of a link in accordance with an embodiment of the present invention connecting two multi-turret processing machines and illustrating an embodiment of a gearcase for the link.

Referring now to FIG. 7, one embodiment of the invention may further comprise a link gearcase 710 that in one embodiment may be near to the bridge 30 for encasing one or more gears for the link processing turret. The link gearcase 710 has a separate mating surface 712 for mating with a mating surface on an upstream gearcase 720 for the upstream multi-turret processing machine 705 and a mating surface 714 for mating with a gearcase 730 for the downstream multi-turret processing machine 715. Preferably these mating surfaces are adjustable. By way of example but not by way of limitation, such adjustability can be accomplished by using slotted holes for the bolt connections to allow axial adjustments of the mating surface of the link gearcase 710 relative to one or more of the gearcases 720 and 730 for the upstream and downstream multi-turret processing machines. In a preferred embodiment, the mating surface 712 for mating with the gearcase of the upstream multi-turret processing machine is at an angle with the mating surface 714 for mating with the gearcase 730 of the downstream multi-turret processing machine so that the planes of the mating surfaces 712 and 714 converge in the direction of the bridge 30. Note that this design is particularly advantageous to prevent oil leaks and maintain integrity of the seal for the gearcase on both the upstream and downstream mating surfaces 712 and 714 while at the same time permitting axial movement for adjustment. It should be noted that this feature of the invention may not be necessary if non-lubricated gearing is utilized.

It should be noted that the bridge 30 is designed to connect to and support a tooling cam for each of the upstream, link and downstream turret. The tooling cams are shown in FIG. 9A with the reference numbers 917.

Figure 3:
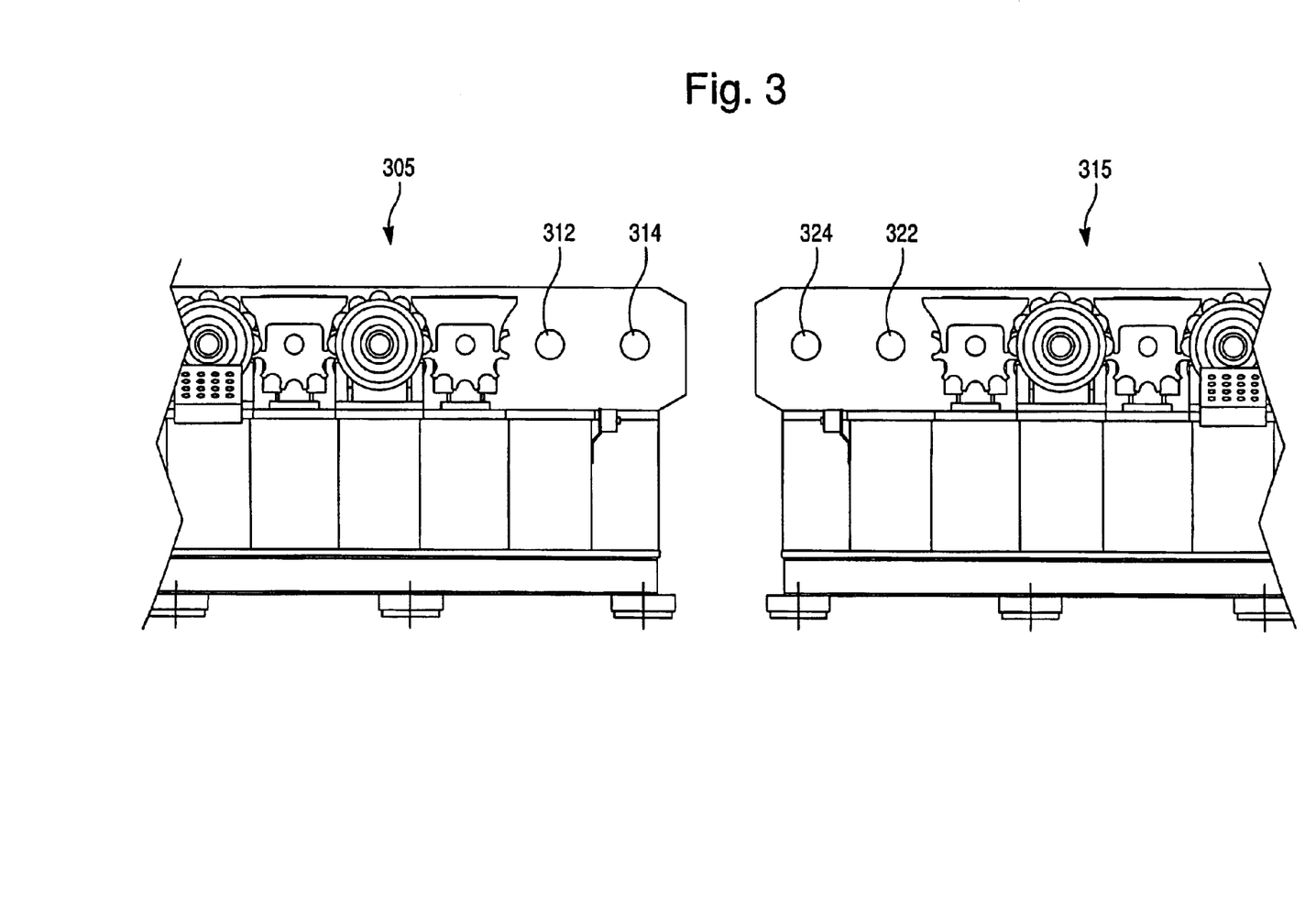
FIG. 3 is a schematic diagram of two fixed base multi-turret processing machines with end turrets and in-feed and discharge assemblies removed.

A method will now be described in accordance with an embodiment of the invention for linking an upstream and a downstream multi-turret processing machines. The method comprises a step of removing a last turret 950 on the upstream multi-turret processing machine 905 (see FIG. 9A) and any discharge transfer assembly from the upstream multi-turret processing machine and removing a first turret 960 and any infeed from the downstream multi-turret processing machine 915. The resulting upstream and downstream machines are shown in FIG. 3. In this regard, an upstream multi-turret processing machine 305 is shown with an aperture 312 where the last turret has been removed, and an aperture 314 where a discharge transfer assembly has been removed. Likewise, FIG. 3 shows a downstream multi-turret processing machine 315 with an aperture 322 where the first turret thereof has been removed and an aperture 324 where an infeed has been removed. FIG. 3 also shows the upstream multi-turret processing machine 305 and the downstream multi-turret processing machine 315 properly spaced and aligned so that a link may be placed therebetween.

Referring to FIG. 4, it can be seen that the upstream and downstream multi-turret processing machines have been properly aligned with the link 10 so that turrets in the upstream and downstream multi-turret processing machines 405 and 415 and a link turret will be substantially in parallel. The link 10 is shown with its base 20 and a bridge 30, with the bridge forming the cross-piece for a T to the base. One end 470 of the cross-piece of the bridge 30 is attached to the base 410 of the upstream multi-turret processing machine 405, while the opposite end 472 of the cross-piece of the bridge is attached to the base 420 of the downstream multi-turret processing machine 415.

In one embodiment of the present invention as previously noted, a bearing plate 430 is disposed adjacent to the bridge 30 to bear a substantial amount of the weight of the last turret of the upstream multi-turret processing machine. Likewise a bearing plate 440 is disposed adjacent to the bridge 30 to bear a substantial portion of the weight of the first turret of the downstream multi-turret processing machine. In this embodiment, at least one shim 460 may be disposed between one of the bearing plates and the bridge 30 in order to align one of the last turret or the first turret in an axial direction with respect to the link turret.

In a further embodiment of the method of the present invention, a temporary alignment beam 450 may be disposed on the base 10 on an opposite side from but in parallel to the bridge 30 for connecting that one portion 452 thereof to the upstream multi-turret processing machine base 410, and at a second portion 454 thereof to the link base, and at a third portion 456 thereof to the base of 420 of the downstream multi-turret processing machine. The temporary alignment beam 450 is positioned, in one embodiment, by means of keyways (40 in FIG. 1) and secured in place via bolts.

The alignment of the bridge 30 may also be accomplished by means of one or more keyways 40 disposed on the base 20 and also on the bases 410 and 420.

A further step in the method is to insert the link turret 910 (shown in FIG. 9A) in the center aperture 32 of the bridge 30.

A step in one embodiment of the method of the present invention may comprise disposing the removed last turret 950 into the upstream aperture 34 of the bridge 30 and disposing the removed first turret 960 into the downstream aperture 36 of the bridge 30 so that a work object such as a can or a bottle may be passed from the last turret to the link turret to the first turret.

A further step in the method comprises inserting one or more gears 920 to mate with a last gear 930 of the upstream multi-turret processing machine 905 and a first gear 940 of the downstream multi-turret processing machine 915. Note that in at least one embodiment the gear or gears 920 are substantially identical to the gears 930 and 1940.

In one embodiment of the method of the present invention, a link gearcase may be inserted that has an upstream mating surface 712 and a downstream mating surface 714 to encase the one or more link gears. In one embodiment of this gearcase, the upstream mating surface and the downstream mating surface converge in a direction of the bridge 30. In some cases, it may be necessary to remove one or more portions of the existing gearcases 720 and 730 to create mating surfaces thereof that will mate with the mating surfaces 712 and 714.

Figure 6:
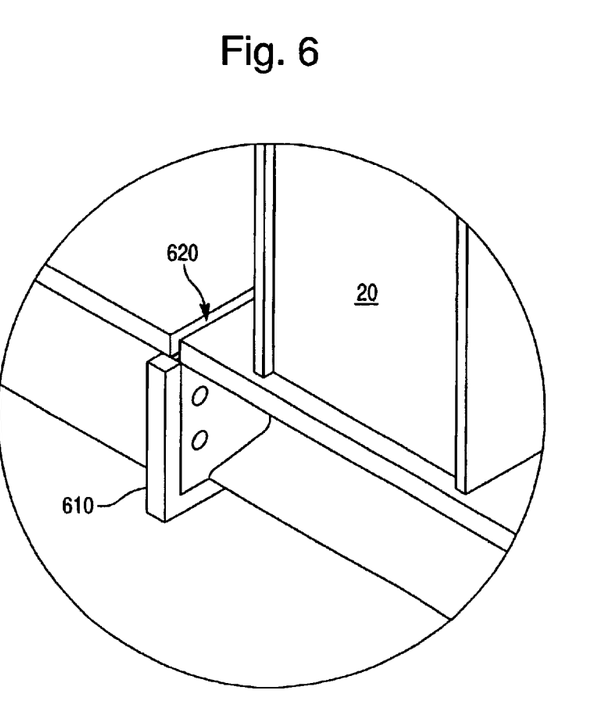
FIG. 6 is a schematic perspective diagram of the creation of a grouting footing.

In a further embodiment of the method of the present invention, footings may be formed between the link base 10 and the bases 410 and 420 of the upstream and downstream multi-turret processing machines to maintain lateral alignment and provide support. In one embodiment, these footings may be formed by means of grouting. By way of example but not by way of limitation, such grouting footings may be formed by creating a three sided dam around each foot of a link base 20 and pouring liquid plastic or metal or other convenient material into the cavity in a stream. FIG. 6 shows the setup for creating the grouting footing between the link base 20 and the bases of the upstream and downstream multi-turret processing machines. The three sided dam is indicated as reference numeral 610. The direction of the pouring of the liquid plastic or metal is reference numeral 620.

Figure 9B:
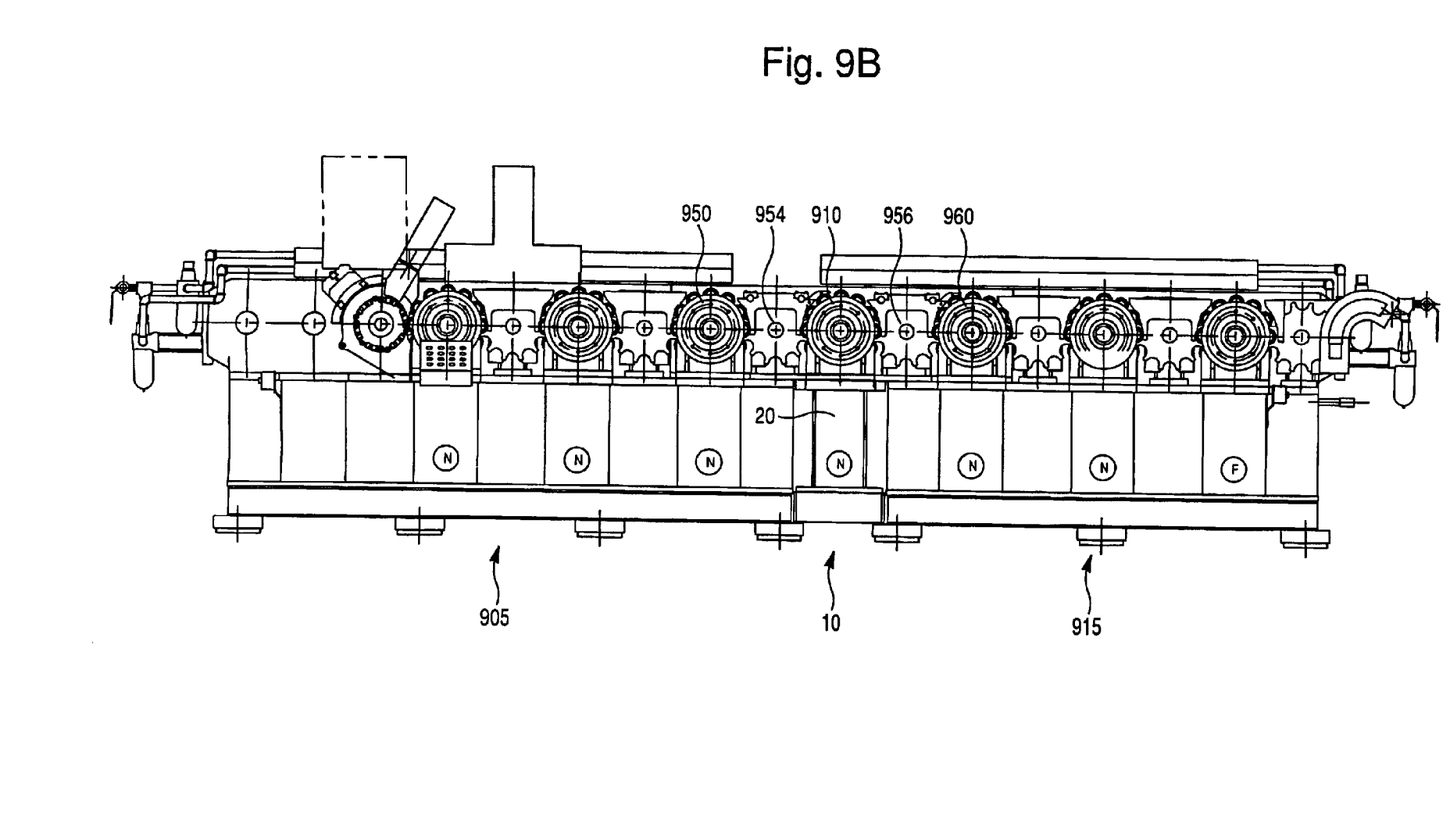
FIG. 9B is a side view of the turrets and starwheels of the multi-turret processing machine shown in FIG. 9A.
Figure 10:
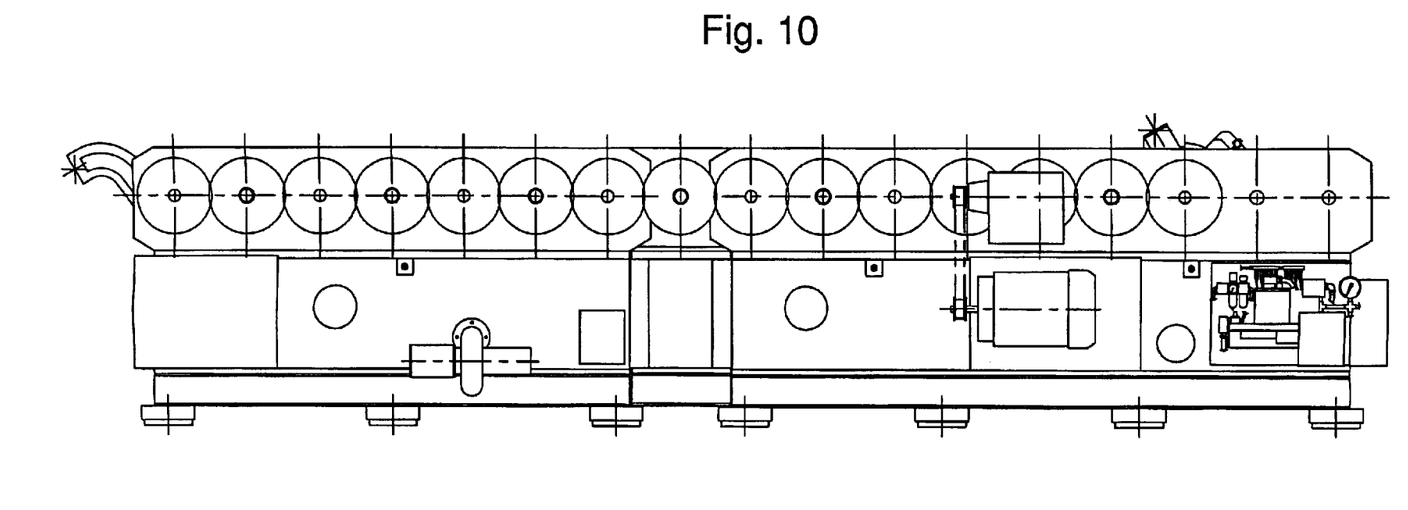
FIG. 10 is a side view of the gear train of the multi-turret processing machine shown in FIG. 9 with the gearcase removed.

An embodiment of a multi-turret processing machine in accordance with the present invention is shown in FIGS. 9A, 9B, and FIG. 10. An upstream multi-turret processing machine 905 and a downstream multi-turret processing machine 915 are shown connected by means of the link 10. The base 20 and the bridge 30 of the link 10 are shown forming a cross-piece for a T on the base 20 in the figures. The last turret 950 in the upstream multi-turret processing machine 905 is shown to be capable of communicating a work piece via a star wheel 954 to the turret 910 on the link 10. The turret 910 is shown to be capable of communicating a work piece via the star wheel 956 to the turret 960 on the downstream multi-turret processing machine 915.

Figure 8:
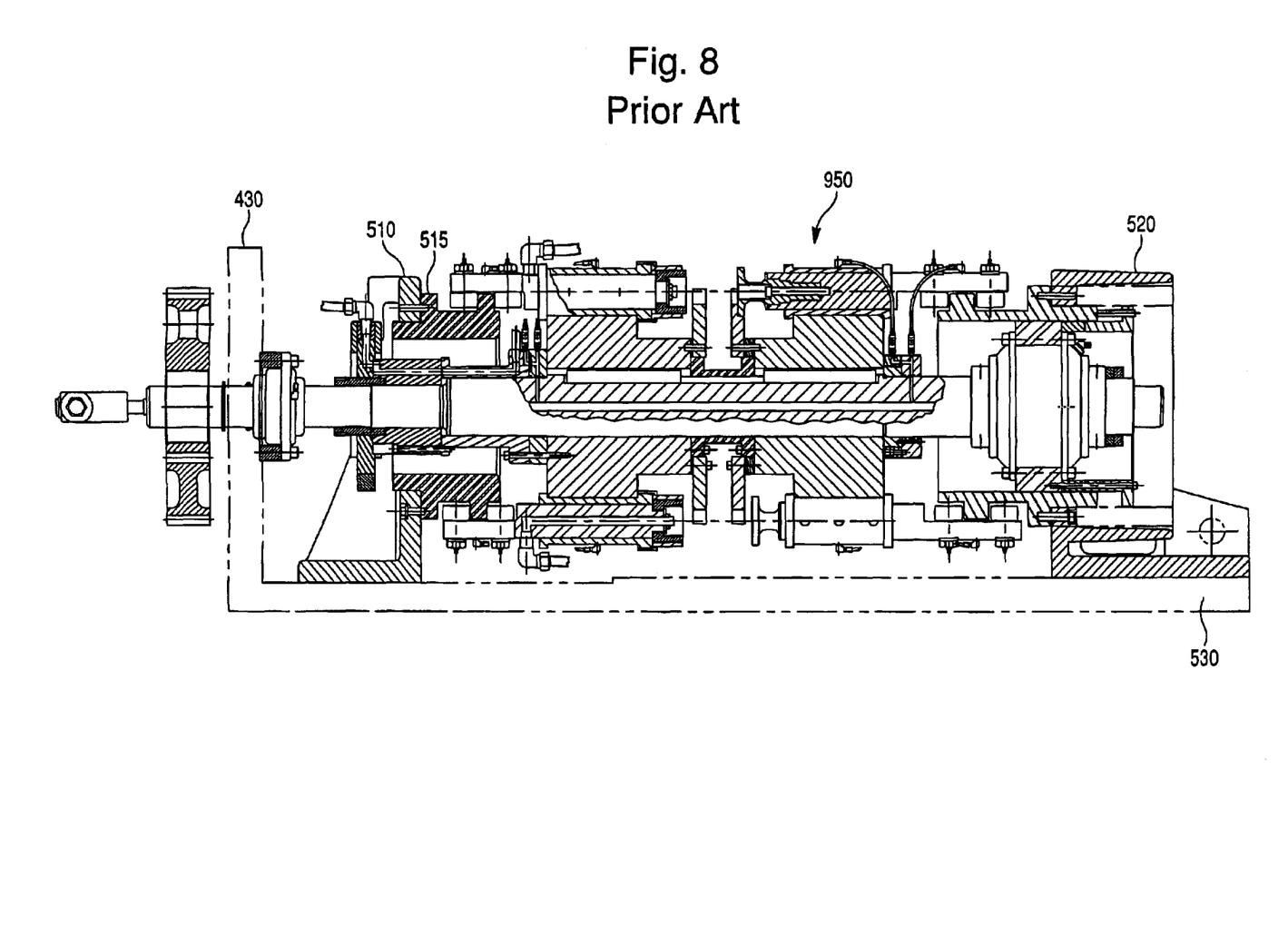
FIG. 8 is a section side view of a conventional fixed base turret for a fixed base multi-turret processing machine.

Referring now to FIG. 8, there is shown a conventional fixed base turret that might be used in a multi-turret processing machine. By way of example but not by way of limitation, the turret shown in FIG. 8 could be the last upstream turret 950 in the upstream multi-turret processing machine 905. The bearing plate 430 for this turret is also shown. On the turret 950 is shown a tooling cam support 510 and a tooling cam 515 at the left end of the turret 950. Likewise, a cam support 520 is shown at the right end of the turret. The turret 950 is disposed on a base 530. In accordance with an embodiment of the present invention, when this turret is attached to the link base by means of the bridge, the bridge replaces the cam support 510 and provides support for the tooling cam 515. In such an embodiment the bridge facilitates alignment and provides a rigid connection between the base 20 of the link and the upstream and downstream multi-turret processing machines.

It should be noted that although the present invention and embodiments have been disclosed in the context of linking two fixed base multi-turret machines, the present invention is equally applicable to linking a fixed base multi-turret processing machine to a modular multi-turret processing machine.

Embodiments of the present invention may conveniently utilize an inline gear driven power-train that is typical of existing pairs of multi-turret processing machines. Thus, backlash is not increased through power transmission devices and conventional timing methods may be used. Depending on the size of the machines being linked, either one motor or dual drive motors may be utilized to power the resulting configuration.

Note that the discharge for the upstream multi-turret processing machine has been converted to a simple transfer to the link turret. Similarly, the infeed for the first turret of the downstream multi-turret processing machine is no longer an infeed but rather a transfer from the link turret. Accordingly, these work object transfers may be conventional in process to that of the original machines being linked.

Note that in some embodiments of the present invention, the bridge for the link 30 may be attached to both a horizontal surface of the base for each of the multi-turret processing machines, as well as to each existing vertical bearing plate. Such an attachment provides stability and robustness. The one or more shims disclosed in the invention are provided between the bridge and the bearing plates to ensure that a shingle exists between the turrets for transfer of work objects such as cans from one turret to the next.

Note that some embodiments of the present invention may include an adjustable gearcase transition weldment that connects both the gearcase covers from existing machines after minor modifications. The adjustable nature of the gearcase transition weldment accommodates for axial shift in the machines required for shingle capacity of the cans for proper transfer between process turrets.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A link for connecting an upstream and a downstream multi-turret processing machines, comprising:
   a base;
   a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel;
   a link processing turret disposed in said center aperture;
   one or more gears for meshing indirectly with gears in the upstream and downstream multi-turret processing machines; and
   a gearcase near to the bridge for encasing the one or more gears for the link processing turret, the gearcase having separate mating surfaces for mating with respective gearcases for the multi-turret processing machines, with at least one of these mating surfaces being adjustable.

2. The link as defined in claim 1, wherein the mating surface for mating with the gearcase of the upstream multi-turret processing machine is at an angle with the mating surface for the mating with the gearcase of the downstream multi-turret processing machine so that planes of the mating surfaces converge in the direction of the bridge.

3. A link for connecting an upstream and a downstream multi-turret processing machines, comprising:
   a base;
   a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel;
   a link processing turret disposed in said center aperture;
   one or more gears for meshing indirectly with gears in the upstream and downstream multi-turret processing machines; and
   a temporary alignment beam disposed on the base on an opposite side from but in parallel to the bridge for connecting at one portion thereof to the upstream multi-turret processing machine, at a second portion thereof to the link base, and at a third portion thereof to the downstream multi-turret processing machine.

4. A link for connecting an upstream and a downstream multi-turret processing machines, comprising:
   a base;
   a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel;
   a link processing turret disposed in said center aperture; and
   one or more gears for meshing indirectly with gears in the upstream and downstream multi-turret processing machines,
   wherein the bridge connects to and supports a tooling cam for each of the upstream, link and downstream turrets.

5. A link for connecting an upstream and a downstream multi-turret processing machines, comprising:
   a base;
   a bridge disposed on the base and forming a cross-piece for a T to the base to allow connection on one end of the cross-piece to a base of an upstream multi-turret processing machine and to allow connection at the opposite end of the cross-piece to a base of a downstream multi-turret processing machine, the bridge having a center aperture, an upstream aperture on an upstream side of the center aperture, and a downstream aperture on a downstream side of the center aperture opposite to the upstream side, the three apertures for holding a last existing upstream turret on the upstream multi-turret processing machine in the upstream aperture, for holding a link processing turret in the center aperture, and for holding a first existing downstream turret in the downstream multi-turret processing machine in the downstream aperture, all three turrets being in parallel;
   a link processing turret disposed in said center aperture; and
   one or more gears for meshing indirectly with gears in the upstream and downstream multi-turret processing machines,
   wherein an upstream bearing plate bears a substantial portion of weight of the last turret and a downstream bearing plate bears a substantial portion of weight of the first turret, and further comprising at least one shim between one of the bearing plates and the bridge in order to align one of the last turret or the first turret in an axial direction with respect to the link turret.

6. The link as defined in claim 5, further comprising an upstream or a downstream grouting footing disposed on at least one side of the base parallel to a centerline for the base.

7. A multi-turret processing machine comprising:
   an upstream multi-turret processing machine with a base and with a plurality of in-line parallel turrets including a last upstream turret and an upstream gear train;
   a downstream multi-turret processing machine with a base and with a plurality of in-line parallel turrets including a first downstream turret and a downstream gear train;
   a separable link connecting the upstream and the downstream multi-turret processing machines, the link including a base, a bridge disposed on the base and forming a cross-piece for a T to the base, one end of the cross-piece being connected to the base of the upstream multi-turret processing machine and the opposite end of the cross-piece being connected to the base of the downstream multi-turret processing machine, the bridge including a center aperture, an upstream aperture on an upstream side of the center aperture holding the last upstream turret therein, a downstream aperture on a downstream side of the center aperture opposite to the upstream side holding the first existing downstream turret therein, and a link processing turret held in the center aperture, all three turrets being in-line and in parallel, the link further including one or more gears for meshing indirectly with gears in the upstream and downstream gear trains, and
   a gearcase near to the bridge for encasing the one or more gears for the link processing turret, the gearcase having a mating surface for mating with an upstream gearcase for the upstream multi-turret processing machine and a different mating surface for mating with a downstream gearcase for the downstream multi-turret processing machine, with at least one of these mating surfaces being adjustable.

8. The multi-turret processing machine as defined in claim 7, wherein the mating surface for mating with the gearcase of the upstream multi-turret processing machine is at an angle with the mating surface for the mating with the gearcase of the downstream multi-turret processing machine so that planes of the mating surfaces converge in the direction of the bridge.

9. The multi-turret processing machine comprising:
an upstream multi-turret processing machine with a base and with a plurality of in-line parallel turrets including a last upstream turret and an upstream gear train;
a downstream multi-turret processing machine with a base and with a plurality of in-line parallel turrets including a first downstream turret and a downstream gear train;
a separable link connecting the upstream and the downstream multi-turret processing machines, the link including a base, a bridge disposed on the base and forming a cross-piece for a T to the base, one end of the cross-piece being connected to the base of the upstream multi-turret processing machine and the opposite end of the cross-piece being connected to the base of the downstream multi-turret processing machine, the bridge including a center aperture, an upstream aperture on an upstream side of the center aperture holding the last upstream turret therein, a downstream aperture on a downstream side of the center aperture opposite to the upstream side holding the first existing downstream turret therein, and a link processing turret held in the center aperture, all three turrets being in-line and in parallel, the link further including one or more
gears for meshing indirectly with gears in the upstream and downstream gear trains,
wherein the bridge connects to and supports a tooling cam for each of the upstream, link and downstream turrets.

10. A multi-turret processing machine comprising:
an upstream multi-turret processing machine with a base and with a plurality of in-line parallel turrets including a last upstream turret and an upstream gear train;
a downstream multi-turret processing machine with a base and with a plurality of in-line parallel turrets including a first downstream turret and a downstream gear train;
a separable link connecting the upstream and the downstream multi-turret processing machines, the link including a base, a bridge disposed on the base and forming a cross-piece for a T to the base, one end of the cross-piece being connected to the base of the upstream multi-turret processing machine and the opposite end of the cross-piece being connected to the base of the downstream multi-turret processing machine, the bridge including a center aperture, an upstream aperture on an upstream side of the center aperture holding the last upstream turret therein, a downstream aperture on a downstream side of the center aperture opposite to the upstream side holding the first existing downstream turret therein, and a link processing turret held in the center aperture, all three turrets being in-line and in parallel, the link further including one or more gears for meshing indirectly with gears in the upstream and downstream gear trains,
wherein an upstream bearing plate bears a substantial portion of weight of the last turret and a downstream bearing plate bears a substantial portion of weight of the first turret, and wherein at least one shim between one of the bearing plates and the bridge is disposed in order to align one of the last turret or the first turret in an axial direction with respect to the link turret.

11. The multi-turret processing machine as defined in claim 10, further comprising a grouting footing disposed on at least one of an upstream or a downstream side of the base of the link and parallel to a centerline for the base to form a bedding plane between the base of the link and the one of the upstream or downstream multi-turret processing machines.

12. A method for linking an upstream and a downstream multi-turret processing machines, comprising the steps of:
removing a last turret and any discharge transfer assembly therefor from the upstream multi-turret processing machine;
removing the first turret and any infeed therefor from the downstream multi-turret processing machine;
aligning the upstream and downstream multi-turret processing machines with a link so that turrets in the upstream and downstream multi-turret processing machines and a link turret will be substantially in parallel, wherein the link comprises a base and a bridge, with the bridge forming a cross-piece for a T to the base to allow connection on one end of the cross-piece to a base of the upstream multi-turret processing machine and to allow connection at the opposite end of the cross-piece to a base of the downstream multi-turret processing machine, the bridge including a center aperture, an upstream aperture on an upstream side of the center aperture, and a downstream aperture on a downstream side of the center aperture, the center aperture for holding a link turret for processing, the upstream aperture for holding the last turret from the upstream multi-turret processing machine and the downstream aperture for holding the first turret of the downstream multi-turret processing machine;
connecting the one end of the cross-piece to the base of the upstream multi-turret processing machine and connecting the opposite end of the cross-piece to the base of the downstream multi-turret processing machine;
inserting the link turret for processing in the center aperture of the bridge;
disposing the removed last turret from the upstream multi-turret processing machine into the upstream aperture of the bridge and disposing the removed first turret from the downstream multi-turret processing machine into the downstream aperture of the bridge so that a work object may be passed from the last turret to the link turret to the first turret; and
inserting one or more link gears to mate with a last gear of the upstream multi-turret processing machine and a first gear of the downstream multi-turret processing machine.

13. The method as defined in claim 12, further comprising the step of inserting a link gearcase having an upstream mating surface and a downstream mating surface to encase the one or more link gears.

14. The method as defined in claim 13, wherein the upstream mating surface and the downstream mating surface are disposed in planes that converge in a direction of the bridge to mate respectively with an upstream mating surface of an upstream gearcase of the upstream multi-turret processing machine and with a downstream mating surface of a downstream gearcase of the downstream multi-turret processing machine.

15. The method as defined in claim 14, further comprising modifying an upstream gearcase for the upstream multi-turret processing machine and a downstream gearcase for the downstream multi-turret processing machine to have respective mating surfaces that converge in a direction of the bridge.

16. The method as defined in claim 13, further comprising:

modifying the gearcase of at least one of the upstream gearcase or the downstream gearcase to have a mating surface at an angle which is not perpendicular to a gear train axis of gears therein in order to mate with one of the upstream or downstream mating surfaces of the link gearcase.

17. The method as defined in claim 12, wherein an upstream bearing plate bears a substantial portion of weight of the removed last turret and a downstream bearing plate bears a substantial portion of weight of the removed first turret, and comprising the step of inserting at least one shim between one of the bearing plates and the bridge in order to align one of the last turret or the first turret in an axial direction with respect to the link turret.

18. The method as defined in claim 12, further comprising connecting a temporary alignment beam on the link on an opposite side from but in parallel to the bridge and connecting one portion of the temporary alignment beam to the upstream multi-turret processing machine, and connecting a second portion of the temporary alignment beam to the downstream multi-turret processing machine.

19. The method as defined in claim 18, further comprising the steps of disposing at least one footing to support the base; and removing the temporary alignment beam that aligns the upstream, downstream and link turrets.

20. The method as defined in claim 12, further comprising the step of forming grouting footings on at least one of an upstream or a downstream side of the base parallel to a centerline for the base to create a bedding plane between the base and the one of the upstream or downstream multi-turret processing machines.

21. The method as defined in claim 20, wherein the grouting footing forming step comprises pouring liquid grouting into a dammed area to form a footing.

* * * * *